United States Patent [19]
Graf

[11] Patent Number: 5,186,570
[45] Date of Patent: Feb. 16, 1993

[54] FASTENING DEVICE FOR THE RELEASABLE FASTENING OF A STRUT TO A COLUMN, A COLUMN FOR HOLDING STRUTS, AND STRUT FOR FASTENING TO A COLUMN

[75] Inventor: Rudolf Graf, Wolfhalden, Switzerland

[73] Assignee: USM U. Schärer Söhne AG., Munsingen, Switzerland

[21] Appl. No.: 666,733

[22] Filed: Mar. 8, 1991

[30] Foreign Application Priority Data

May 9, 1990 [CH] Switzerland .......................... 1579/90

[51] Int. Cl.⁵ .............................................. F16B 1/00
[52] U.S. Cl. .................................... 403/174; 403/178; 403/191; 403/264
[58] Field of Search ............... 403/174, 178, 171, 176, 403/170, 173, 49, 217, 260, 245, 246, 190, 191, 187, 297, 264

[56] References Cited

U.S. PATENT DOCUMENTS

| | | | |
|---|---|---|---|
| 1,241,137 | 9/1917 | Mitchell | 403/191 |
| 3,003,646 | 10/1961 | Wolf . | |
| 3,545,796 | 12/1970 | Nicholls | 403/187 |
| 3,945,743 | 3/1976 | Koch | 403/297 X |
| 4,190,375 | 2/1980 | Berry | 403/260 X |
| 4,921,370 | 5/1990 | Handler et al. | 403/191 X |

FOREIGN PATENT DOCUMENTS

| | | | |
|---|---|---|---|
| 566256 | 4/1958 | Belgium . | |
| 2138782 | 12/1972 | Fed. Rep. of Germany . | |
| 2403832 | 8/1975 | Fed. Rep. of Germany . | |
| 2555787 | 6/1976 | Fed. Rep. of Germany . | |
| 8813241 | 1/1989 | Fed. Rep. of Germany . | |
| 1489468 | 6/1967 | France | 403/171 |
| 2602838 | 2/1988 | France | 403/191 |
| 441871 | 1/1968 | Switzerland | 403/174 |

Primary Examiner—Peter M. Cuomo
Attorney, Agent, or Firm—Brady, O'Boyle & Gates

[57] ABSTRACT

The fastening device (5) for the releasable fastening of a strut (3a–3d) to a column (1) comprises a retainer ring (7), attachable to the column (1), and a connecting element (9a–9d) for connecting the strut (3a–3d) to the retainer ring (7). The connecting element (9a–9d) has at one of its ends diametrically opposed jaws (33a, 33b) which extend around the lateral surfaces (16a) of the retainer ring (7) whereby the strut (3a–3d) is fastened to the column (1) safe from twisting even with respect to large torques and bending moments. The exact horizontal position of the strut or struts (3a–3d) can be adjusted by rotating the retainer ring (7).

8 Claims, 1 Drawing Sheet

U.S. Patent  Feb. 16, 1993  5,186,570
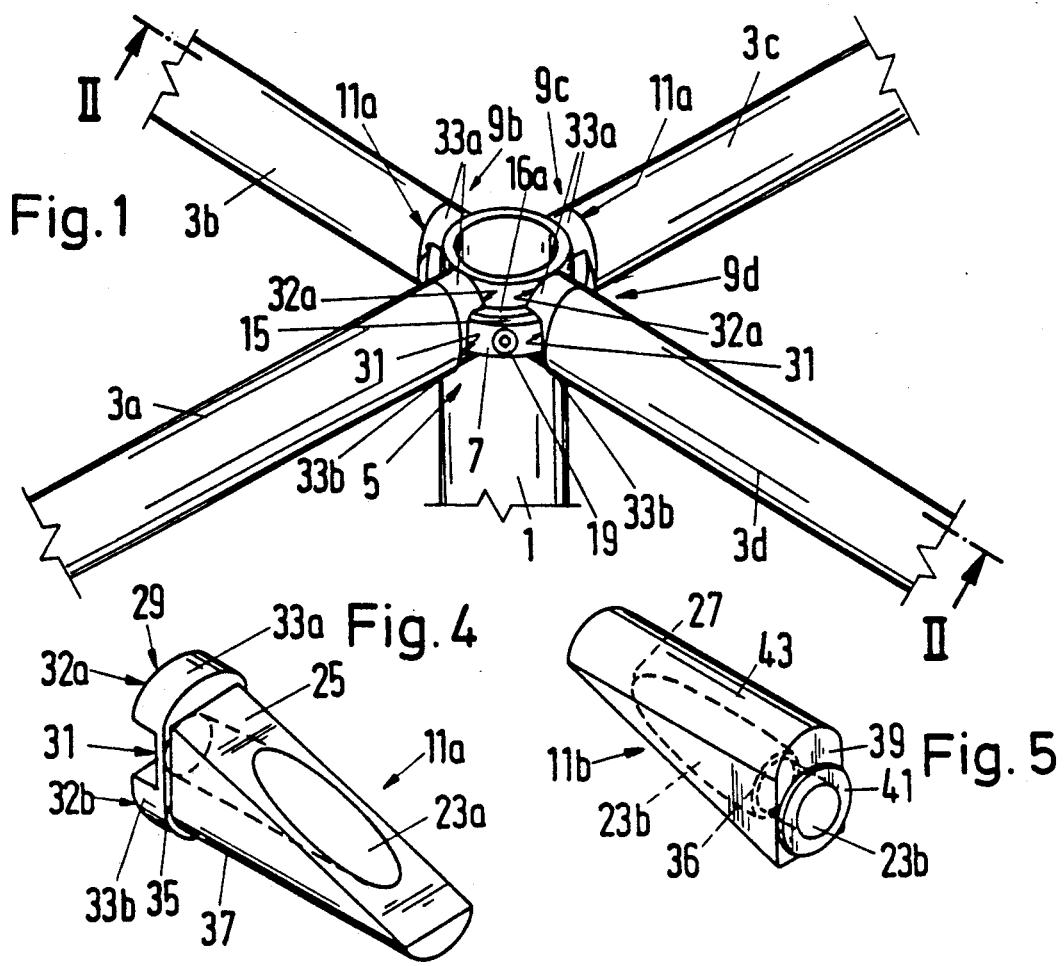
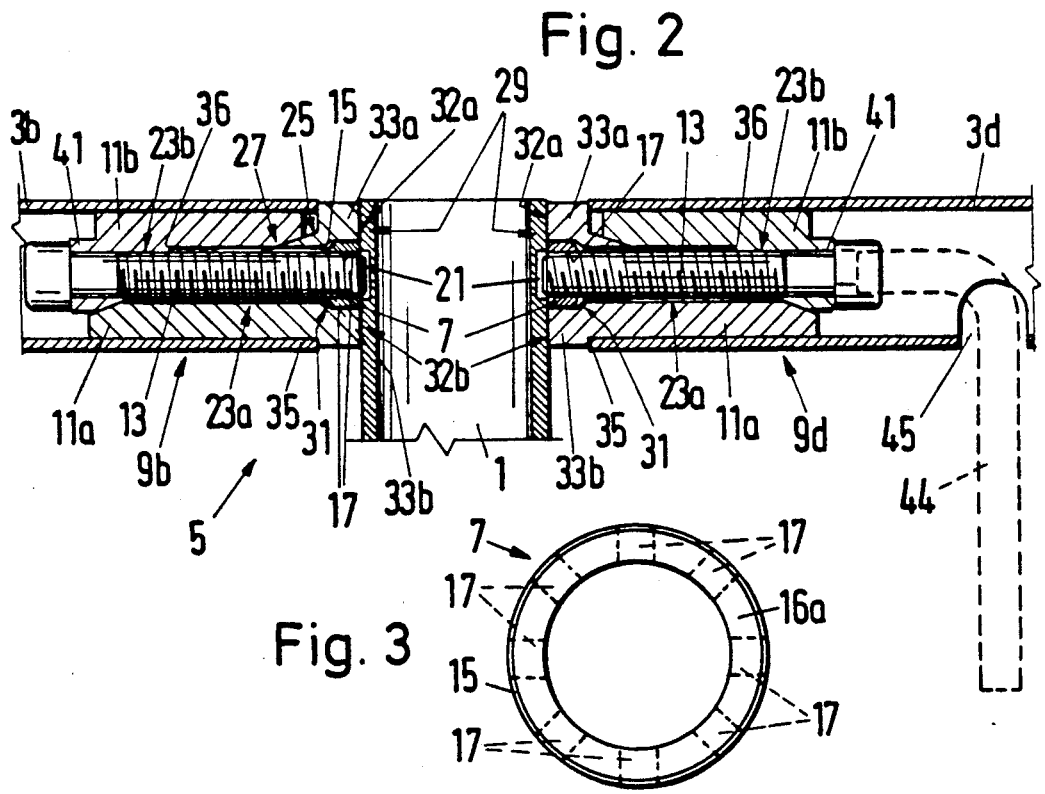

FASTENING DEVICE FOR THE RELEASABLE FASTENING OF A STRUT TO A COLUMN, A COLUMN FOR HOLDING STRUTS, AND STRUT FOR FASTENING TO A COLUMN

The invention relates to a fastening device for the releasable fastening of a strut to a column, column for holding struts, and a strut for fastening to a column, in accordance with the disclosure of the invention.

A fastening device for the releasable fastening of a column with a strut has been known from U.S. Pat. No. 4,365,907. In the conventional fastening device, a rectangularly tubular, hollow strut is connected with a rectangularly tubular, hollow column with the aid of a central wedge member provided with a threaded passage bore as well as two lateral wedge members urged by the central wedge member against the inner wall of the strut. The three wedge members are connected with one another by a deformable strip. A base plate is located in a marginal recess at the outer wall of the column, secure from twisting, the end face of one end of the strut resting, in turn, on this base plate. The base plate is pinned to the column so that no twisting can take place. At the mounting site of the strut, the column is provided with two diametrically opposed bores. A screw can be passed through the bore in opposition to the mounting site, the head of the screw then being in contact with the hole rim of the other bore. In order to make the connection between strut and column, the screw is placed into the column, the base plate is placed on the screw on the outside of the column, and the screw is threaded into the central wedge member. Then the strut tightened, the central wedge member being pulled against the column and the two lateral wedge members being pressed thereby against the inner wall of the strut. There is no possibility of mounting two oppositely located struts at the same level.

Another fastening device has been known from U.S. Pat. No. 3,945,743. Here again, a rectangularly tubular, hollow column. In contrast to the abovementioned known fastening device, two wedge sleeves are provided in place of the three wedge members, these sleeves being displaceable axially with respect to each other along wedge-shaped end faces, wherein respectively one sleeve side of respectively one wedge sleeve is pressed against the inner wall of the strut. Axial displacement is brought about by a clamping screw extending through the sleeves, this screw being retained in the column. Here, too, there is no possibility of mounting several struts at the same level; also, the strut is not secured against twisting.

It is an object of the invention to provide a twist-proof fastening device for a strut on a column which can transmit high torques and bending moments from the strut to the column and permits the fixation of several struts at an identical level.

This object has been attained, with respect to the fastening device, the column for retaining struts, and the strut for fastening to a column with the fastening device, by the disclosure of the invention.

One example of the fastening device according to this invention, of the column, as well as of the strut, will be described in greater detail below with reference to the drawings wherein:

FIG. 1 is a perspective view of a column and four struts affixed thereto by means of a fastening device, FIG. 2 is a longitudinal section through the column, the fastening device, and two struts along line II—II in FIG. 1, FIG. 3 is a top view of a retainer ring of the fastening device, FIG. 4 is a perspective view of a wedge member of a pair of wedge members pertaining to the fastening device, and FIG. 5 is a perspective view of the other wedge member of the pair of wedge members.

FIG. 1 shows a vertically standing, hollow column 1 to which are mounted four hollow struts 3a through 3d of oval cross section at the same level at right angles to one another by means of a fastening device 5. The fastening device 5 comprises a cylindrical retainer ring 7 attachable to the column 1 and, per strut 3a-3d to be affixed, one pair of wedge members 9a through 9d with respectively two wedge members 11a and 11b, as illustrated in the longitudinal sectional view of FIG. 2, and respectively one clamping screw 13 with a hexagonal recess in the screwhead.

The inner diameter of the retainer ring 7, as illustrated in a top view in FIG. 3, is larger by one tolerance than the outer diameter of the column 1. The outer surface is beveled with respectively one chamfer 15 toward the lateral surfaces 16a and 16b, respectively; only the lateral surface 16a can be seen in FIG. 3. The two chamfers 15 permit easy mounting of the wedge member pairs 9a through 9d. Eight identical threaded passage bores 17 are provided at equal spacings in the retainer ring 7. The thickness of the retainer ring 7 is dependent on the torques and bending moments of the struts 3a-3d to be transmitted to the column 1. The retainer ring 7 is held in an annular groove 21 of the column 1 by means of a headless screw 19 threaded into one of the threaded passage bores 17 as the fixation element, as illustrated in FIG. 1.

The wedge member pairs 9a–9d comprise, as mentioned above, respectively two wedge members 11a and 11b as shown in a perspective view in FIG. 4 and, respectively, FIG. 5. Each wedge member pair 9a–9d is penetrated in the longitudinal direction by a bore 23 which is larger by one tolerance than the shank diameter of the clamping screw 13. Both wedge members 11a and 11b have mutually adapted wedge surfaces 25 and 27, respectively, extending at an acute angle toward the bore hole axis.

The wedge member 11a is located, as shown in FIG. 2, with its end face 29 at the tubular outer surface. Two diametrically opposed jaws 33a and 33b, spaced apart from each other by a recess 31, are provided at the end face 29. The distance between the two jaws 33a and 33b, i.e. the width of the recess 31, is larger by one tolerance than the width of the retainer ring 7. The end faces 32a and 32b of the jaws 33a and 33b are curved in concave fashion in such a way that they rest flatly on the outer surface of the column in the mounted condition. The head part of the wedge member 11a carrying the jaws 33a and 33b is broadened in such a way that a shoulder 35 is formed which supports the front face of the end of the respective strut 3a, 3b, 3c or 3d facing the column 1. The broadened portion, for esthetic reasons, is smaller by one tolerance than the cross section of the strut 3a, 3b, 3c or 3d, as can be seen in FIG. 2. A curved lateral surface 37 adjoins at a right angle the supporting surface for the strut 3a, 3b, 3c or 3d of the extension 35; the curvature of this lateral surface is adapted to the inner curvature of the strut 3a, 3b, 3c or 3d in the intended supporting zone.

The bore 23 passing through each wedge member pair 9a-9d is denoted, in the wedge member 11a, by 23a and, in the wedge member 11b shown in FIG. 5, by 23b. This bore, just as in case of the wedge member 11a, extends perpendicularly to the end face 39. The diameter of the bore 23b is reduced in step fashion with respect to its portion adjacent to the end face 39. This inside step 36 facilitates removal of the pair of wedge members 9 from the interior of the strut 3, as will be described below. A planar-machined, annular extension 41 is arranged around the outlet of the bore 23b on the end face 39; this extension is to provide perfect seating for the screwhead of the clamping screw 13. The extension 41 is formed in order to avoid machining of the entire end face 39. A curved lateral surface 43 extends at a right angle to the front face 39, the curvature of this lateral surface being adapted to the internal curvature of the strut 3a, 3b, 3c or 3d in the intended seating zone.

In order to affix, for example, the strut 3d shown in FIG. 2, the retainer ring 7 is placed onto the column 1 and secured, by means of the headless screw 19 visible in FIG. 1, in the groove 21 of the column 1 against dropping out. The headless screw 19 has not as yet been clamped tightly in the groove 21. The pair of wedge members 9d is introduced into the strut end to be attached to the column 1 with the clamping screw 13 having been inserted in its bore 23, the screwhead lying on the side of the shoulder 41 of the wedge member 11b, until the strut end abuts against the shoulder 35. The wedge pair 9d seated in the strut 3d is placed with its jaws 33a and 33b onto the retainer ring 7 at the place of one of the threaded passage bores 17, and the clamping screw 13 is threaded into the threaded passage bore 17. During the threading step, the curved end faces 32a and 32b of the jaws 33a and 33b are pulled against the outer shell of the column 1, on the one hand, and the wedge members 11a and 11b are mutually displaced on their wedge surfaces 25 and 27, on the other hand, the curved lateral surfaces 37 and 43 being urged against the inner wall of the strut 3d. The strut 3d is thus axially connected via the lateral force-locking fashion and, on account of the oval strut shape with the analogously configured wedge member pair 9d, in a shape-mating fashion against twisting. With its jaws 33a and 33b, the wedge member pair 9d is also connected in a shape-mating fashion against twisting with the retainer ring 7 which latter, due to its clearance tolerance, is likewise retained secure against twisting at the column 1. The strut 3d is accordingly fastened to the column 1 secure against twisting.

The length of the clamping screw 13 is selected so that it engages the groove 21 either not at all or only to a slight extent, thus ensuring, for reasons of manufacturing tolerance, a perfect bracing of the wedge members 11a and 11b against the inner wall of the strut, and a perfect pressing engagement of the end faces 32a and 32b against the outer shell of the column, without the clamping screw 13 resting on the bottom of the groove.

The clamping screw 13 is tightened by means of a socket wrench which is introduced through the strut 3d into the end facing away from the column 1. If this strut end has already been affixed to another column, the socket wrench 44 is introduced through a slot 45 in the strut 3d in the proximity of the end to be affixed, as illustrated in dashed lines in FIG. 2. The headless screw 19 is tightened as soon as the struts 3a to 3d are located in their desired horizontal position.

In order to release the fastening device, the procedure is performed in chronologically reversed sequence of operations from that described above for assembly. After loosening of the clamping screw 13, ring 7. It may now happen that, in spite of a released clamping screw 13, the wedge members 11a and 11b remain clamped in the strut 3a, 3b, 3c or 3d and thus do not slide out by holding the strut 3a, 3b, 3c or 3d in an inclined position. In this case, a cylindrical mandrel, not shown, the diameter of which is smaller by one tolerance fit than the diameter of the bore 23a in the wedge member 11a but larger than the diameter 23b of the wedge member 11b adjacent to the end face 39, is utilized. The mandrel, inserted in the bore 23 from the end face 29 thus abuts against the shoulder 36. With a vigorous hammer stroke on the projecting end of the mandrel, both wedge members 11a and 11b in the strut 3a, 3b, 3c or 3d can be detached from each other.

If the wedge members 11a and 11b, the inner diameter of the struts 3a-3d, the groove 21, the retainer ring 7, and the length of the clamping screw 13 are designed with narrow tolerances, then there is no need for the headless screw 19 as the fixing element. The headless screw 19 is then utilized merely as a mounting aid and is no longer required, and removed again, with the fastening device having been completely mounted. In this case, eight struts 3 can be fastened to a retainer ring 7.

Instead of making the retainer ring 7 in the form of a closed ring, it can also consist of two ring halves, not shown, wherein the two ring halves are preferably overlapping respectively in the zone of one of the tapped passage bores 17 and, in the mounted condition, are then held together by the headless screws 19 or the clamping screws 13, or by means of one headless screw and one clamping screw 19 and 13. A divided retainer ring has the advantage of being usable also with columns which do not have a free end over which the retainer ring could be placed.

In place of the wedge member pairs 9, it is also possible to use a bolt, not shown, with an outer cross section adapted to the inner cross section of the strut 3a-3d, one end face of this bolt carrying jaws designed analogously to the jaws 33a and 33b. This bolt likewise has a bore in analogy to the pair of wedge members 9a-9d, so that the bolt can be fastened to the retainer ring 7 by means of a mounting screw analogously to the clamping screw 13. The bolt can be connected in shape-mating fashion with the strut 3a-3d by means of a screw, not shown, which extends through the strut sidewall.

In case the struts 3a through 3d need not transmit excessively large load-bearing forces to the column 1, then the groove 21 can be eliminated; in this case, the retainer ring 7 and the struts 3a-3d attached thereto are held only by means of one or several headless screws 19 or, respectively, clamping screws 13 which press against the outer surface of the column.

If a solid strut is to be connected to the column, then a tubular section, not shown, can be used in place of the aforedescribed bolt and/or the wedge member pairs 9a through 9d, the inner cross section of this tubular section being adapted to the outer cross section of the strut 3a-3d. Diametrically opposed tube wall sections are bent inwardly at one end of this tubular section in correspondence with the recess 31. The inwardly bent wall portions exhibit respectively one central cutout toward the axis of the tubular section, this cutout being larger by one tolerance than the diameter of a mounting screw which latter extends through the cutouts into the threaded passage bore 17 of the retainer ring 7 in order to fasten the tubular section to this ring 7. The bent wall portions simultaneously serve as an abutment for the end face of the strut end to be fastened to posed tubular flaps, separated by the cutout, then act as the jaws 33a and 33b. The tubular section is the tube wall and engaging into a tapped bore in the strut. Hollow struts 3a through 3d can be fastened in identical fashion as well.

By means of the retainer ring 7 of the fastening device according to this invention, struts which must transfer large torques and bending moments to the column can be advantageously fastened to such a column. It proved to be especially advantageous that the exact horizontal position of the strut or struts can be adjusted by turning the retainer ring 7. Since the struts 3a-3d are fastened only to the outer shell of the column, no special demands need to be met by the inner jacket of the column 1; the fastening device can also be attached to a solid column.

I claim:

1. A fastening device for releasably fastening the front end face of at least one tubular strut (3a-3d) to the cylindrical peripheral side wall surface of a cylindrical column (1), said strut (3a-3d) having a hollow interior surface, a cylindrical peripheral surface and the front end face thereof to be fastened to said column (1) being at right angles to the longitudinal axis of the strut, comprising a retainer ring (7), one connecting element (9a-9d) for each strut (3a-3d), and a single piece clamping element (13) for each connecting element, said retainer ring (7) having a central opening with a cross-sectional area of a size to receive said column (1) therein, said connecting element (9a-9d) having a central bore (23a, 23b), said clamping element (13) being situated in said central bore (23a, 23b), said connecting element (9a-9d) having a first pressure contact surface (32a, 32b) being at least partly formed to said cylindrical peripheral side wall surface of said column (1) and said single piece clamping element (13) connected to pressably force-lock said first pressure contact surface against said cylindrical peripheral side wall surface of said column (1), a bearing shoulder (35) on said connecting element inwardly of said first pressure contact surface (32a, 32b) receiving said front end face of said strut, said connecting element (9a-9d) having a second pressure contact surface (37, 43) being at least partly formed to said hollow interior surface of said strut (3a-3d), and said clamping element (13) connected to pressably force-lock said second pressure contact surface against said hollow interior surface of said strut (3a-3d), and press said front end face of said strut against said bearing shoulder (35), said retainer ring (7) having engaging means (17) for said clamping element (13) enabling said clamping element (13) to apply a force between said connecting element (9a-9d), said retainer ring (7), said strut (3a-3d) and said column (1) for pressably force-locking said first pressure contact surface (32a, 32b) against said cylindrical peripheral side wall surface of said column (1) and said second pressure contact surface (37, 43) against said hollow interior surface of said strut (3a-3d), and said clamping element (13) having power coupling means only inside the hollow interior space of the strut (3a-3d) whereby openings are avoided through the peripheral surface of the end region of said tubular strut (3a-3d) immediately adjacent the front end face thereof.

2. A fastening device according to claim 1, in which said first pressure contact surface having two surface parts (32a, 32b) being separated by a recess (31) of a size to receive and surround said retainer ring (7), and said two surface parts (32a, 2b) and said recess (31) integrally forming said first pressure contact surface on a single body portion of said connecting element.

3. A fastening device according to claim 1, in which said connecting element (9a-9d) has a longitudinal axis and comprises a pair of mating wedge members (11a, 11b), said central bore comprises a pair of central bores (23a, 23b) one in each of said wedge members (11a, 11b) along the longitudinal axis of said connecting element, a said second pressure contact surface (37, 43) on each of said wedge members (11a, 11b) facing away from each other, and said clamping element (13) passing through said pair of aligned bores (23a, 23b) into engagement with aid engaging means (17) on said retainer ring (7) to impart mutual axial displacement of said wedge members (11a, 11b), whereby said second pressure contact surfaces (37, 43) of said pair of wedge members are urged against said hollow interior surface of said strut.

4. A fastening device according to claim 3, in which said clamping element is a screw (13), and said engaging means on said retainer ring (7) comprises a radial threaded bore (17) adapted to threadably receive said screw (13) to axially shift said pair of wedge members (11a, 11b) with respect to each other.

5. A fastening device according to claim 3, in which said pair of wedge members (11a, 11b) having cross-sections approximately the same as the cross-section defined by the hollow interior surface of the tubular strut (3a-3d).

6. A fastening device according to claim 5, in which said cross-section defined by said hollow interior surface of said tubular strut (3a-3d) and the cross-sections of said pair of wedge members comprise oval cross-sections for the force-locking had resistance-to-twisting connection between said connecting element (9a-9d) and said strut (3a-3d).

7. A fastening device according to claim 1, including a plurality of engaging means (17) on said retainer ring (7) for fastening a plurality of connecting elements (9a-9d) to said retainer ring at selectable mutual angular spacings.

8. A fastening device according to claim 1, including at least one continuous outer groove (21) extending around the cylindrical side wall surface of said cylindrical column (1), and adjustable connecting means (19) on said retainer ring (7) engaged in said outer groove (21) for releasably connecting the axial position of said retainer ring (7) on said column (1).

* * * * *